United States Patent
Zoot

[15] 3,684,381
[45] Aug. 15, 1972

[54] LASER BEAM PLANAR REFERENCE
[72] Inventor: Robert M. Zoot, Los Angeles, Calif.
[73] Assignee: Ati, Inc.
[22] Filed: March 23, 1970
[21] Appl. No.: 21,773

[52] U.S. Cl. .................356/138, 350/16, 356/249, 350/21, 350/25
[51] Int. Cl. ..............................................G01b 11/26
[58] Field of Search............356/148, 249, 138, 172; 350/16, 21–26, 55, 68; 33/46

[56] References Cited

UNITED STATES PATENTS

| | | | |
|---|---|---|---|
| 2,921,496 | 1/1960 | Thurnheer | 356/249 |
| 2,460,836 | 2/1949 | Lovins | 356/249 |
| 3,499,713 | 3/1970 | Ito | 350/25 |
| 2,152,726 | 4/1939 | Baroni | 350/24 |
| 3,533,700 | 10/1970 | Alexander | 356/172 |

FOREIGN PATENTS OR APPLICATIONS

| | | | |
|---|---|---|---|
| 672,579 | 5/1952 | Great Britain | 350/21 |

*Primary Examiner*—Ronald L. Wibert
*Assistant Examiner*—Jeff Rothenberg
*Attorney*—Henry M. Bissell

[57] ABSTRACT

A device for automatic and passive self-leveling or self-aligning of a laser beam to a predetermined horizontal or vertical position without dependence upon mechanical moving parts. The device utilizes two trays of microscope immersion oil mounted in a suitable frame through which a laser beam is directed. The oil responds to the pull of gravity and automatically corrects for misalignments through small angles up to several minutes of arc so as to restore the alignment of the laser beam. The device includes beam rotating elements which permit projection of the beam in any desired direction.

3 Claims, 4 Drawing Figures

PATENTED AUG 15 1972
3,684,381
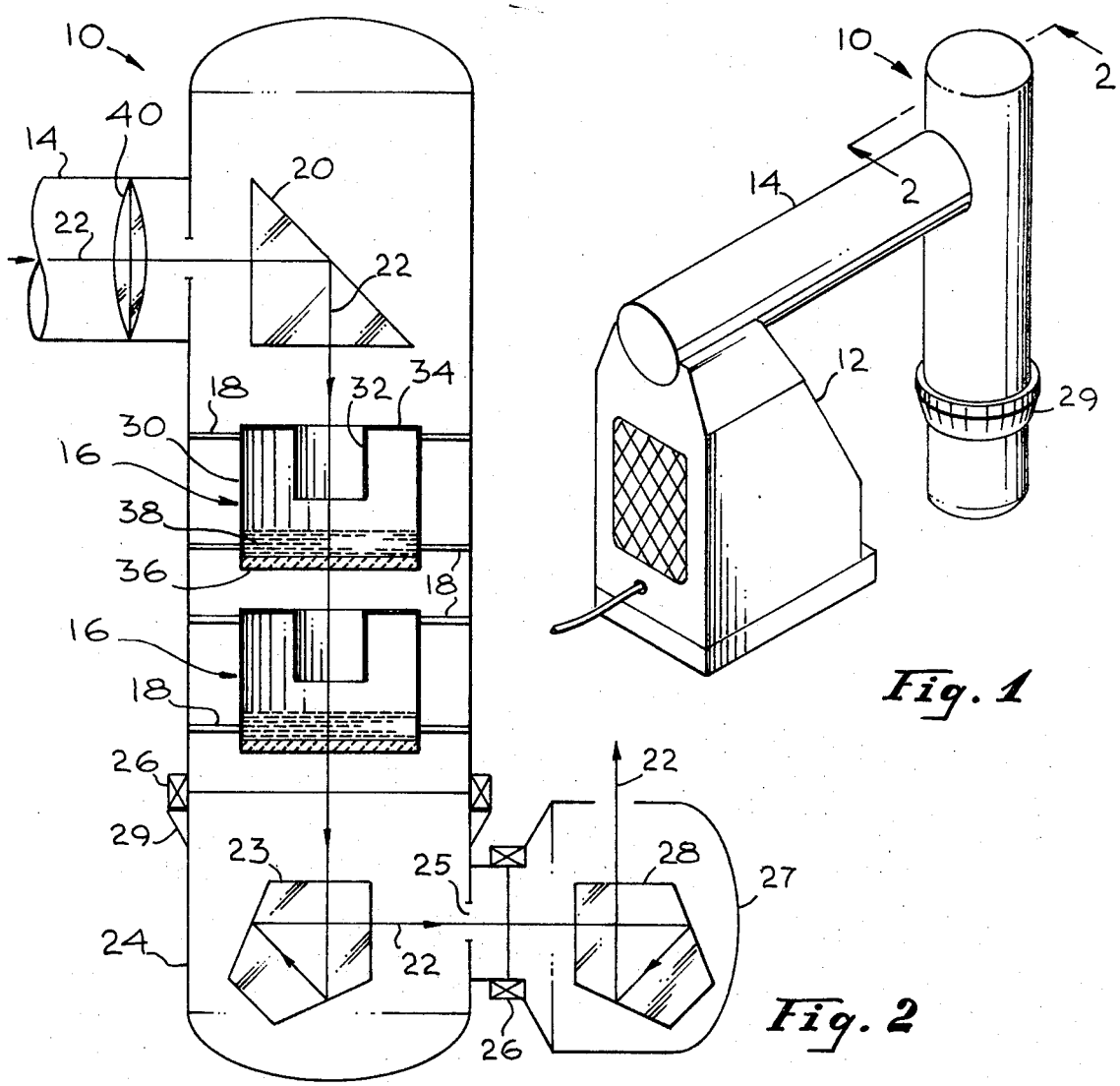
Fig. 1
Fig. 2
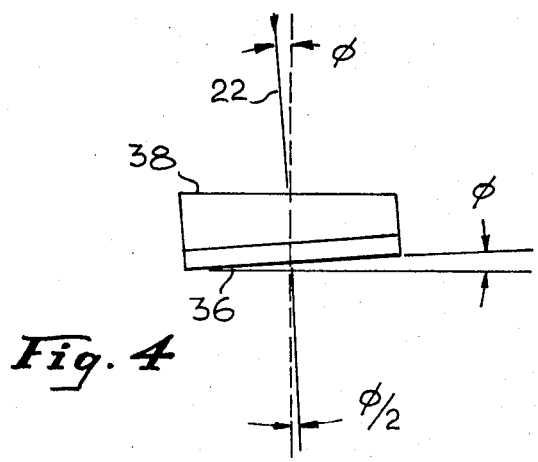
Fig. 4
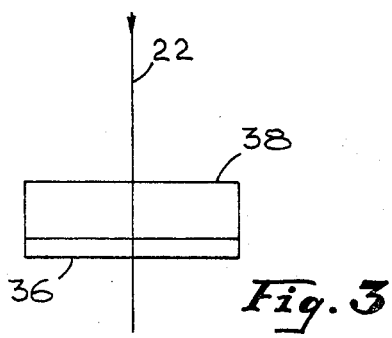
Fig. 3
INVENTOR.
ROBERT M. ZOOT
BY Henry M. Bissell
ATTORNEY

LASER BEAM PLANAR REFERENCE

BACKGROUND OF THE INVENTION

1. Field of the Invention

This invention relates to the field of optical devices, and, more particularly, to such devices having to do with the alignment of optical mechanisms.

2. Description of the Prior Art

The best known related prior art devices are what are commonly called self-leveling alignment transits or self-leveling telescopes. Such devices are available on the market under various manufacturer's names including Kollmorgen, Zeiss and others. These devices use a telescope which is interrupted optically in the center of the unit by optical devices which direct the light down through a hanging pendulum type of device. This hanging pendulum is supported by a knife edge at its upper end so that as the instrument is tilted over a relatively small angle, on the order of plus or minus 1 or 2 minutes, the prism swings to a vertical position and redirects the light rays transferred through the telescope to a predetermined horizontal or vertical orientation.

Another such device utilizes a self-leveling mirror positioned on top of a pivoting knife edge. The region below the knife edge is weighted and suspended in an oil-like viscous fluid which damps out the mechanical oscillation normal in pendulum type devices. In this mechanism the mirror mounted atop the knife edge balance system is continuously leveled or brought into a vertical plane independent of the position of the structure. The limit of the operating range of this device is usually on the order of plus or minus 1 minute of arc.

One particular disadvantage of these types of devices, apart from the rather limited angle of deviation from the vertical or horizontal position through which they can operate effectively, is the presence of a dead band or threshold error which is inherent in their operation because of the mechanical nature of the mechanism employed. This dead band occurs because no matter what type of knife edge or other mechanical configuration is used, or how precisely fabricated the bearings are, some definite amount of tilt angle is needed before the balancing mechanism can swing, because of the friction encountered at the pivot point or pivot edge. Moreover, because of their nature, these mechanisms are necessarily quite delicate and any rough handling is likely to be destructive of the device; at least, it would require rebalancing and adjustment before it can be used after having been hit or dropped.

SUMMARY OF THE INVENTION

In brief, arrangements of the present invention do not depend on mechanical moving parts, fine balancing edges or the like, but rather employ two cups of a clear oil known as microscope immersion oil. These cups each comprise a glass or glass-type material as the bottom, on top of which the oil is supported, in a manner that permits its upper surface to remain horizontal in response to the force of gravity when the mechanism is tilted. The two cups or containers of the microscope immersion oil are mounted one above the other along a vertical portion of the path of the laser beam. When the device is tilted slightly, the surfaces of the oil and the associated glass base form small wedges because the glass base tilts with the mechanism while the surface of the oil remains horizontal under the influence of gravity. For small angles of deviation, such that the tangent is substantially equal to the sine, the angle of deviation of a beam passing through a wedge of relatively small angle is one half the angle of the wedge itself. Thus, the two oil-glass wedges through which the deviated laser beam is directed serve to bring the laser beam back into a true vertical or horizontal alignment.

In accordance with an aspect of the invention, the viscosity of the oil may be selected to control various parameters as desired. For example, the viscosity may be chosen to provide a damping effect at the natural vibration frequency of the device in order to limit the vibrations thereof.

In one particular arrangement in accordance with the invention, a laser beam is directed into the upper end of a vertical column at which it is deflected into a vertical orientation by reflection through a 90° prism. The pair of containers comprising glass bottoms with oil at suitable levels therein are located one above the other in the path of the laser beam. At the lower end of the column in a first removable portion of the mechanism is a penta prism for translating the laser beam back to the horizontal again for projection through a window in a side of the column. This lower portion is removable so that the vertical projection of the laser beam may be utilized if desired. Moreover, the lower portion may be rotated so as to project the beam in any azimuthal direction horizontally. A second removable portion is similarly attached to the first removable portion but oriented 90° to the first portion so as to project the beam to any angle in a vertical plane normal to the beam existing from the first lower portion. Thus by suitably positioning the two lower portions of the apparatus, the beam may be projected in any desired direction. Graduated scales are provided for setting the rotatable/removable portions precisely as desired.

In accordance with an aspect of the invention, the oil containers comprise outer and inner cylindrical portions joined at the top so as to receive the oil contained therein when the entire mechanism is tilted to a substantial degree, even to the extent of laying it on its side or even inverting it, while preventing the oil from spilling or running out of the container.

BRIEF DESCRIPTION OF THE DRAWING

A better understanding of the present invention may be had from the consideration of the following detailed description, taken in conjunction with the accompanying drawing, in which;

FIG. 1 is a perspective view of one particular arrangement in accordance with the invention;

FIG. 2 is a sectional view of a portion of FIG. 1 showing the internal construction of an arrangement in accordance with the invention;

FIG. 3 is a schematic view of a portion of FIG. 2 presented for the purpose of illustrating the principle of the invention; and FIG. 4 is a schematic view similar to FIG. 3 representing the device tilted through a small angle.

DESCRIPTION OF THE PREFERRED EMBODIMENT

As shown in FIGS. 1 and 2, the preferred embodiment comprises a cylindrical unit 10, having its axis vertically aligned, and provided with end caps closing the opposite ends of the cylinder 10. The device is particularly developed for use with a laser beam source 12 as shown in FIG. 1, and is attached to the beam cylinder 14. Within the housing of the cylinder 10 are a pair of beam correcting cups 16 which are substantially identical in configuration and are supported from the housing walls of the cylinder 10 by means of supports such as 18. Above the upper beam leveling cup 16 is a prism 20 which is included for the purpose of changing the direction of the laser beam, represented by the line 22, from the horizontal to the vertical. The prism 20 is of course, unnecessary should the beam 22 be already vertically aligned so that it enters the cylinder 10 through the top or bottom thereof. The cylinder 10 is shown as having a first lower portion 24 containing a penta prism 23 which serves the function of restoring the laser beam 22 to the horizontal direction for projection outward through an opening 25. The lower cylinder portion 24 is mounted in a bearing arrangement 26 for 360° rotation about the longitudinal axis of the cylinder 10 so that the beam 22 may be projected in any azimuthal direction. Moreover, the lower cylinder portion 24 is removable from the remainder of the cylinder 10 so that the laser beam may be projected directly downward instead of being translated to the horizontal, if desired.

A second lower portion 27 is shown removably mounted via a second bearing 26 to the side of the first lower portion 24 and arranged for 360° rotation about a horizontal axis. A second penta prism 28 is provided to rotate the beam 22 to a vertical plane. The portion 27 may be removed if horizontal beam projection is desired. Thus by suitably positioning the two lower portions 24, 27 the beam may be projected in any desired direction. Graduated scales such as the scale 29 shown in FIG. 1 are provided to establish the desired setting. Alternatively one lower portion may be fixed and the other one rotated to sweep the projected beam through some spherical section, as desired.

The beam correcting cups 16 may comprise an outer cylinder 30 and an inner cylinder 32 joined together by an upper horizontal closure member 34. This portion of the cups 16 is preferably fashioned of metal, such as brass or stainless steel, so as to be liquidtight throughout its extent, the only opening in the cup being the central opening in the inner cylinder 32 at the top. At the bottom of the cup 16, the outer walls 30 are joined to a glass plate 36. This plate may be of any good optical glass or glass-type material. Each cup 16 is partially filled with a clear fluid 38 having an index of refraction which precisely matches that of the plate 36. Where the plate 36 comprises optical glass, which has an optical index of approximately 1.5, the fluid 38 preferably comprises microscope immersion oil which has the same index of refraction.

The operation of the beam correcting cups 16 can best be explained by reference to FIGS. 3 and 4 which show the glass plate 36 and the fluid 38, shown in FIG. 3 in the horizontal position and in FIG. 4 as tilted through a slight angle from the horizontal.

It is well known within the field of optics that the angle of deviation of a beam passing through a clear wedge of relatively small angle is equal to one-half of the angle of the surfaces of the wedge. This principle holds true for those angles for which the difference between the tangent and the sine in negligible. Arrangements in accordance with the present invention provide two such wedges arranged in such a fashion that the angle of the surfaces is automatically variable so as to be precisely equal to the angle of deviation from the vertical of a laser beam passing therethrough.

As shown in FIG. 3, the glass-oil combination is exactly horizontal so that the opposite surfaces are parallel and the laser beam 22 passes therethrough without any deviation. (The glass-oil boundary has no effect of course, since the index of refraction for both materials is exactly the same).

In FIG. 4, the glass 36 is shown tilted slightly from the horizontal through an angle $\phi$. The downwardly directed laser beam 22, which is understood to deviate in direction with the angle of tilt of the structure, therefore also shifts from the vertical by the angle $\phi$ as indicated in the region above the oil 38 in FIG. 4. Under the influence of gravity, the oil 38 flows until its surface stabilizes at the horizontal, thus establishing an angle between the upper surface of the oil 38 and the bottom surface of the glass 36 which is equal to $\phi$, exactly the same as the angle of tilt of the laser beam 22. As a result, within the small angle range of operation of the correction principle as indicated above, the deviated laser beam is corrected by one-half the angle of deviation from the vertical, namely by the angle of $\phi/2$. By passing the beam through a second cup 16 which develops a wedge having surfaces at an angle $\phi$ in the manner shown in FIG. 4, another correction of the deviated laser beam occurs, again by the same angle $\phi/2$. Thus, after passing through two beam correcting cups 16, the deviated laser beam 22 has been corrected to the vertical so that its direction of projection out of the lower end of the cylinder 10 is the same as it was before the deviation was introduced. Correction of the deviation of the laser beam in this fashion occurs for any angle of deviation within the range in which the tangent of the angle may be considered equal to the sine of the angle. This correction is accomplished automatically without any need for adjustment whatsoever, the only requirement being that enough time be allowed for the fluid 38 to flow and assume its new attitude with a horizontal upper surface. This normally takes but a fraction of a second to a few seconds, depending on the viscosity of the oil used for the response or damping which is desired.

It will be noted that the configuration of the cups 16 including the upper enclosure element 34 and the inner cylindrical portion 32 serves to provide a pocket for the fluid 38 such that the fluid 38 may be contained therein regardless of the attitude of the correcting device. Thus, for example, the device may be laid on its side or accidentally completely inverted without the fluid 38 being able to run out of the cups 16.

Depending upon the size of the beam correcting cups 16 and the dimensions of the fluid layer 38, the meniscus or curved surface at the top of the fluid layer 38 may not result in a negative power affecting the size of the laser beam. However, if the aperture of the cups 16 is small enough and the size of the laser beam 22 is large enough that the beam subtends a concave surface at one or both of the cups 16, a correcting lens such as 40 may be added between the beam correcting device and the laser beam source itself. The focal length or power of the correcting lens 40 should be positive and of such a value as to precisely compensate for the total negative correction of the two concave surfaces on top of the fluid layers 38 in the cups 16. As an example, if the total amount of deviation from the meniscus effect on the fluid layers 38 results in a net change of minus 1 diopter, a plus 1 diopter lens should be used for the lens 40. In this way, the wave front projected out of the device 10 will be identical to the wave front entering the device. In most cases, however, the size of the laser beam is on the order of 2 millimeters in diameter, which is of such a small size relative to the amount of the curved surface which is subtended by the meniscus at the top of the fluid layers 38 that the effect on the wave front of the laser beam is negligible. The device thus automatically corrects an input laser or other optical beam for deviations in vertical or horizontal level positions within the range of small angles for which it is operative.

Devices embodying the invention have been tested over a range of plus or minus 5 minutes of arc with no readable error being detected. The testing unit consisted of an autocollimator having an angular resolution of plus or minus one-tenth of an arc second. This range of operation without introduction of error is considerably in excess of the operating range of previously known self-leveling devices. Moreover, devices embodying the present invention are substantially more rugged by nature than those previously known devices because of the elimination of dependence upon knife edge pivot supports, precision bearings, and the like. Equipment embodying the present invention may be dropped, misused, or mishandled without fear of damaging precision bearings or pilot surfaces. The mishandling of the equipment can be so severe that it borders on actual fracturing of the internal glass components, which is the practical limit of abuse for any optical instrument. As mentioned, by virtue of the rotary bearings 26 at the points of connection of the removable lower housing portions 24 and 27 containing the penta prisms 23 and 28, either a vertical or horizontal plane may be swept out by the beam 22 in order to establish orthogonal planes, as well as a spherical section at any desired angle.

Devices of the type described herein above may for example be applied to the field of surveying wherein the laser and the leveling device may be set on a transit with the output of the laser beam being automatically maintained precisely level. The surveyor may then sweep out a horizontal plane without the necessity of readjusting the transit or tripod because of the equipment going out of a predetermined level reference. Deviation resulting from bearing run out of an ordinary transit or theodolite is automatically compensated for. Other applications of the self-aligning arrangement of the present invention will be obvious.

It will be understood that the configuration shown in the drawing is merely one particular embodiment which may be utilized. The device may also be built with the laser beam entering the bottom or side below the beam correcting cups so that the direction of traverse therethrough is from bottom to top. It is thus possible to have a downwardly directed vertical beam and plane reference, an upwardly directed beam and plane reference, or a horizontal beam and plane reference as shown in FIG. 2. The device is operative with laser beam or other light sources and may be used for optical sighting applications in general.

Although there has been described above specific arrangements of a laser beam planar reference device in accordance with the invention for the purposes of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the accompanying claims.

What is claimed is:

1. A beam aligning device for automatically correcting slight deviations of a laser or other light beam comprising:

a vertical housing having an entrance end and an exit end;

means for causing the beam to traverse a path through the entrance end of said housing in fixed alignment with said housing;

first and second beam leveling cups mounted in sequential positions within the housing in the path of the beam, each of said cups having a bottom in the form of a transparent plate and containing a fluid having an index of refraction substantially equal to the index of refraction of the transparent plate, so that upon deviation of the housing from the vertical such that the cups are tilted, the fluid forms an upper surface at an angle with the lower surface of the glass plate in a manner which provides correction of the beam deviation from the vertical by one-half of the angle of deviation whereby the beam is vertical at the exit end of said housing; and a correcting lens positioned adjacent the entrance end of the housing to compensate for any spreading tendency induced by a possible curvature of the surface of the fluid within the cups.

2. A beam aligning device for automatically correcting slight deviations of a laser or other light beam comprising:

a vertical housing having an entrance end and an exit end;

means for causing the beam to traverse a path through the entrance end of said housing in fixed alignment with said housing;

first and second beam leveling cups mounted in sequential positions within the housing in the path of the beam, each of said cups having a bottom in the form of a transparent plate and containing a fluid having an index of refraction substantially equal to the index of refraction of the transparent plate, so that upon deviation of the housing from the vertical such that the cups are tilted, the fluid forms an upper surface at an angle with the lower surface of the glass plate in a manner which provides correction of the beam deviation from the vertical by one-half of the angle of deviation whereby the beam is vertical at the exit end of said housing;

a first rotatable section at the exit end of said housing containing a penta prism located to intercept the beam after it has passed through the transparent plates in order to translate the beam to a selected horizontal direction, said section having an opening aligned with the translated beam for projection of the beam therethrough; and a second rotatable section removably mounted to the first rotatable section opposite the opening therein and containing a second penta prism for rotation of said beam to any desired angle in a vertical plane normal to the direction of the beam projected through said opening.

3. Apparatus in accordance with claim 2 further including graduated scales for each of said rotatable sections to provide an indication of the direction of projection of the beam therefrom.

* * * * *